July 20, 1965        E. H. PAULI        3,195,364
VARIABLE SPEED PULLEY
Filed Feb. 13, 1963
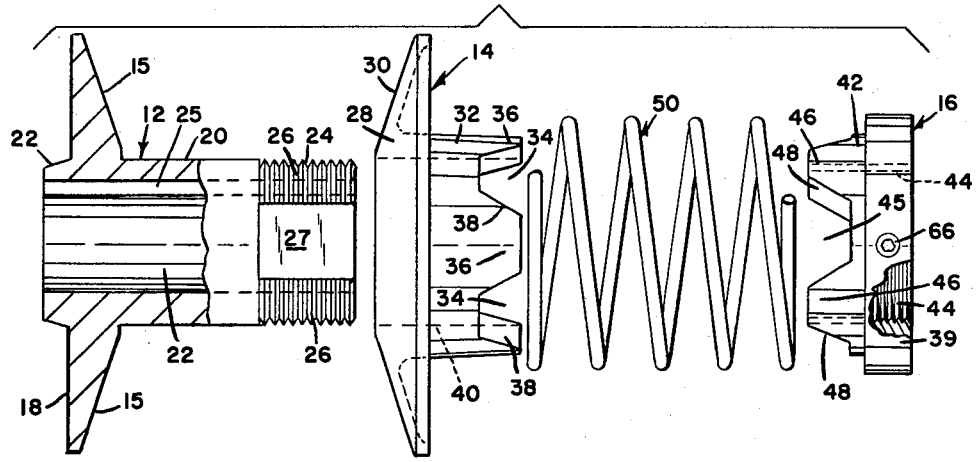
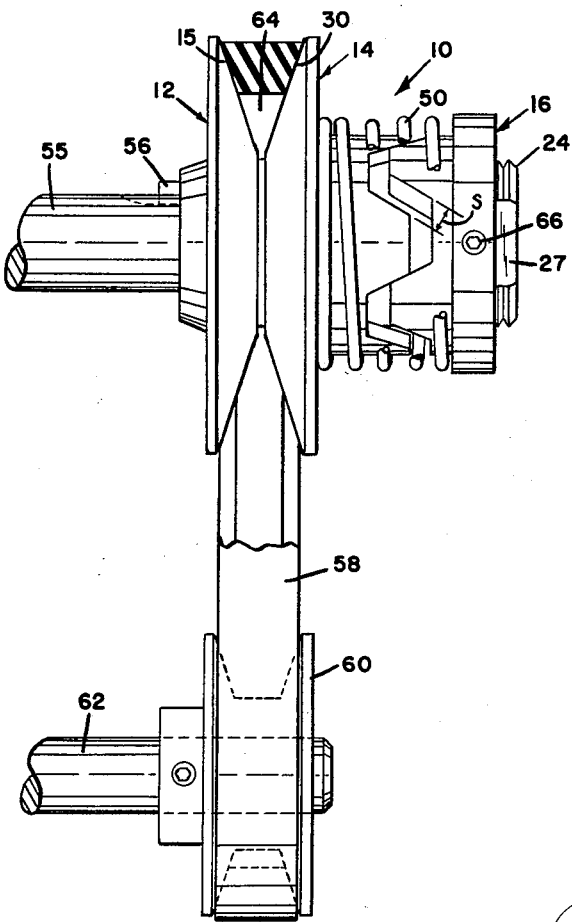
INVENTOR.
ERNEST H. PAULI.
BY
Raymond Curtin
ATTORNEY.

3,195,364
VARIABLE SPEED PULLEY
Ernest H. Pauli, 1000 Oakland Ave., Plainfield, N.J.
Filed Feb. 13, 1963, Ser. No. 258,257
5 Claims. (Cl. 74—230.17)

This invention relates broadly to motion transmission mechanism. More particularly, this invention relates to an improved pulley construction of the type employed with an endless belt member for transmitting movement of a rotary drive shaft to a driven shaft. Still more particularly, this invention relates to an improved variable speed pulley of the split disk type wherein there is provided a pulley construction composed of two parts arranged to engage a belt member interposed therebetween.

In a pulley construction of the type described, the two parts in engagement with the belt member are movable relative to one another so as to vary the effective pitch diameter of the pulley. The pulley construction employed in this invention is formed so that a change in the pitch diameter of the pulley may occur automatically in response to a condition, such as, the loosening of the belt as occasioned by excessive wear. With the improved variable pitch or variable diameter pulley serving as the subject of this invention, it is possible to adjust the member for a minimum pitch diameter while automatically compensating for belt slippage and belt stretch. It is also possible to obtain an action commonly described as a centrifugal clutch action when reversal of the direction of rotation of the pulley occurs.

It is an object of this invention to provide an improved pulley construction of the variable pitch type wherein relative movement between parts of the pulley is effected in response to slippage of belt engaged by the pulley, the relative movement in turn overcoming the slippage and re-establishing firm engagement between the belt and pulley.

It is another object of this invention to provide an improved variable pitch diameter pulley including parts permitting adjustment to provide for minimum pitch diameter while enabling the automatic adjustment of the parts to vary the pitch diameter to compensate for belt wear.

Another object of the invention is the provision of an improved pulley construction of the variable pitch type wherein there is provided two disk members, including means providing inter-engaging cam surfaces, forming opposed sections for engaging a belt member.

An additional object of this invention is the provision of an improved variable pitch pulley having opposed disk sections, one of which is arranged to fit telescopically within the other.

A still further object of this invention is the provision of an improved pulley construction of the kind under consideration wherein an adjustable member having threaded engagement with one of the disk sections is employed to regulate the spacing between the two disk sections through engagement with the other disk section.

Another object of the invention is the provision of an improved pulley construction as described wherein the adjustable member is equipped with inclined cam surfaces adapted to engage with complementary cam surfaces arranged on the second disk section in order to accomplish relative movement between the disk sections to overcome the effects of belt slippage and/or belt stretch.

The objects of this invention are attained with a pulley assembly including a first disk section having an apertured hub portion integrally formed thereon, a second disk section slidably mounted on said hub with an inclined surface confronting an inclined surface on the first disk section in spaced relation thereto and cam means on the opposed surface thereof, and an adjustable sleeve member in engagement with the hub portion of said first disk section, the sleeve member having cam elements for engagement with the cam means on said second disk section.

Other objects and features of the invention will be apparent upon a consideration of the ensuing specification and drawings in which:

FIGURE 1 is an exploded view of the parts forming the improved variable pitch diameter pulley forming the subject of this invention; and FIGURE 2 is a side view with portions broken away in the interest of clarity of an arrangement for transmitting shaft motion incorporating a pulley of the kind contemplated by this invention.

Referring more particularly to the drawings for an illustration of a preferred embodiment of the invention, there is shown a pulley assembly 10 constructed in accordance with the invention.

The assembly 10 comprises principally a first disk member 12, a second disk member 14 and an adjusting member 16. Disk 12 includes an enlarged end portion 18 having an elongated central hub portion 20, through which shaft accommodating passage 22 extends, integrally formed therewith. End 24 of disk 12 remote from end portion 18 is provided with a threaded section 26, having flats 27 circumferentially spaced thereabout. End portion 18 is provided with an inclined belt engaging surface 15. Hub portion 20 has formed throughout its axial extent a slot 25 communicating with the passage 22 and serving as a keyway. While the disk member 12 may be fabricated in any desired manner, it has been determined that when the material from which the member is to be formed is one of the well-known plastic compounds, the part may be formed by molding one half of the member in a conventional molding operation and assembling it with another half so molded.

Disk member 14 includes an enlarged end portion 28 having an inclined belt engaging surface 30 formed thereon. Extending rearwardly from the end portion 28 is portion 32 having a plurality of circumferentially spaced notches 34 defining a plurality of axially extending projections 36 provided with inclined cam surfaces 38. A passage 40 extends through member 14 and has a diameter enabling it to be slidably mounted over the hub portion 20 of disk member 12.

Adjustable nut member 16 is provided with a head portion 39 and a shank portion 42 integrally formed therewith. An internally threaded passage 44 extends through member 16. Shank portion 42 is provided with a plurality of notches 45 defining a plurality of projections 46 having inclined surfaces 48 for engagement with cam surfaces 38 formed on disk member 14 in a manner to be later described.

Considering the construction described as it is used in a pulley and belt arrangement for transmitting motion between a drive shaft and a driven shaft, disk member 14 is slidably positioned over the threaded end of disk member 12 with inclined belt engaging surface 30 confronting inclined belt engaging surface 15 of disk member 12. Springs member 50 is next introduced over the threaded end of disk member 12. Adjustable nut member 16 is then threadably assembled to the threaded section 26 of the disk member 12 with projections 46 confronting notches 34 on member 14 to form assembly 10. The assembly is then slidably mounted on drive shaft 55 and secured thereto by key 56. With the minimum pitch diameter determined by design or otherwise, adjustable nut 16 is secured to disk member 12 by drawing up set screw 66 at a point so it will engage flat 27 corresponding to the minimum diameter. Belt 58 is introduced over pulley assembly 10 and a pulley member 60 secured to driven shaft 62. Belt 58 engages the pulley assembly 10 in the groove 64 formed by surfaces 15 and 30 on the disks 12 and 14 respectively. When the belt is snugly secured in the groove 64, the minimum pitch diameter of the pulley is determined. This action obtains for disk member 14 may slide axially along the hub portion of disk member 12 in response to pressure exerted by the belt 58 toward fixedly secured adjusting nut 16 (which now acts as a stop member) against the action of spring 50, and with the inclined cam surfaces 38 in engagement with inclined cam surfaces 48 on nut 16. With the parts constructed as described, it will be obvious that the axial movement of disk 14 will be accompanied by slight rotational movement of the part.

Power applied to the drive shaft 55 is transferred to the driven shaft 62 through pulley assembly 10, belt 58 and pulley 60 secured to the driven shaft. The disk member 12 is secured to the drive shaft 55 through key 56; the motion of disk 12 is transferred to disk 14 through snugly assembled belt 58. Under these circumstances there is no relative movement between disks 12 and 14. The function of spring 50 is to resist outward movement of disk 14 along the hub portion of disk 12. Accordingly it is a relatively light spring incapable of exerting any substantial force such as would create a binding action on disk 14 in the direction of surface 15 on disk 12.

As belt stretch or slippage occurs due to prolonged use of the pulley and belt unit, the belt will not transmit the movement of surface 15 of disk 12 directly to surface 30 of disk 14 at the same 1:1 ratio, but rather at some other ratio dependent upon the amount of slippage or stretch. The construction illustrating the invention however acts automatically to re-establish the 1:1 ratio that a tight or snug belt ensures. To this end it will be apparent that the adjusting nut 16, being secured to the disk member 12 through set screw 66, continues to rotate at the same speed as disk 12. Relative movement between nut 16 and disk 14 accurs along cam surfaces 38 and 48 in a direction urging disk 14 toward the enlarged end portion of disk 12 to tightly grip belt 58 at a position slightly higher in groove 64 than originally determined when the minimum pulley diameter was established.

Another feature of the invention is the centrifugal clutch action available when the direction of rotation of the drive shaft is reversed. The projections 36 and 46 are normally in engagement throughout a portion only of their length and engagement is limited to one side only of each projection. Upon a reversal of rotation of disk 12 (in response to a reversal of rotation of drive shaft 55) the opposed or unengaged sides are engaged but only after the spaces serving to define their disengagement has been traversed. With the construction described it is possible to control the centrifugal clutch action by adjusting member 16 relative to member 14 to obtain a desired spacing within limits allowed by the spacing of teeth or projections 36 and 46.

It will be appreciated, as stated above, that once the adjustable nut 16 is secured to disk 12 by set screw 66, the nut 16 becomes a stop member limiting movement of movable disk member 14 away from the enlarged end portion 18 of disk 12. This, in turn, limits the width of the belt accommodating groove 64 and the depth to which the belt may ride in the groove establishing the minimum pitch diameter of the pulley. The disk member 14 will slide toward nut 16 under influence of the force exerted by the belt as it is assembled therewith until the projections 36 engage in the bottom of the notches 45. As pointed out above, the spring 50 is not strong enough to prevent this action and does not interfere with any slight rotational displacement that might occur during the axial movement of disk 14 as sliding engagement between surfaces 36 and 46 occurs.

Other constructions and arrangements falling within the spirit of the invention will suggest themselves to those skilled in the art without departing from the scope thereof.

I claim:
1. A variable pitch pulley comprising a first disk member including an enlarged end portion presenting a belt engaging surface and an axially extending central hub portion; a second disk member having a belt engaging surface slidably mounted on the central hub portion of said first disk member with its belt engaging surface confronting the belt engaging surface of said first disk member, said second disk member being provided with a plurality of spaced projections, having sloped surfaces, extending rearwardly therefrom; and an adjustable stop member positioned on the central hub portion of said first disk member and releasably secured thereto, said stop member being provided with forwardly extending projections having sloped surfaces drivingly engaging the sloped surfaces of said projections on said second disk member so that movement imparted to said first disk is transferred to said second disk member.

2. The invention set forth in claim 1, including yieldable means interposed between said stop member and said second disk member.

3. A variable pitch pulley comprising a first disk member including an enlarged end portion presenting a belt engaging surface and an axially extending central hub portion; a second disk member having a belt engaging surface slidably mounted on the central hub portion of said first disk member with its belt engaging surface confronting the belt engaging surface of said first disk member, said second disk member being provided with a plurality of projections extending rearwardly therefrom; and means adjustably secured to the hub portion of said first disk member, drivingly engaging said second disk member, said means limiting axial movement of said second member in a direction such that the space between the belt engaging surfaces of said disk members is increased.

4. In motion transmission mechanism comprising a drive shaft, a pulley secured to said drive shaft, a driven shaft, a pulley secured to said driven shaft and an endless belt member encircling said pulleys so that motion developed by said drive shaft is transmitted to said driven shaft, at least one of said pulleys including a first disk member forming a first split pulley section having a belt engaging surface thereon and an elongated hub portion extending centrally thereof in rigid engagement with its associated shaft; a second disk member forming a second split pulley section encircling said hub portion of the first disk member, said second disk member having a belt engaging surface confronting the belt engaging surface of said first disk member so that motion of the first disk member is transmitted to the second disk member through said belt, and means, independent of said belt, forming an adjustable driving connection between the two disk members, said means being effective in response to a variation in speed between said disk members to vary the distance between said disk members to snugly accommodate said belt and re-establish said belt as the means for transmitting motion from said first disk to said second disk.

5. In motion transmission mechanism comprising a drive shaft, a pulley secured to said drive shaft, a driven shaft, a pulley secured to said driven shaft and an endless belt member encircling said pulleys so that motion developed by said drive shaft is transmitted to said driven shaft, at least one of said pulleys including a first disk member forming a first split pulley section having a belt engaging surface thereon and an elongated hub portion extending centrally thereof in rigid engagement with its associated shaft; a second disk member forming a second split pullley section encircling said hub portion of the first disk member, said second disk member having a belt engaging surface at one end thereof confronting the belt engaging surface of said first disk member so that motion of the first disk member is transmitted to the second disk member through said belt and a plurality of projections extending rearwardly from the other end thereof, and means, independent of said belt, forming an adjustable driving connection between the two disk members, said means including an adjustable member releasably secured to said first disk, said adjustable member having projections extending forwardly into engagement with said disk projections and being effective upon a change in speed between the two disk members to vary the position of the second disk member relative to the first disk member.

References Cited by the Examiner

UNITED STATES PATENTS

| | | |
|---|---|---|
| 2,377,013 | 5/45 | Johnson. |
| 2,541,766 | 2/51 | Jereb _____ 74—230.24 |
| 2,678,566 | 5/54 | Oehrli. |

FOREIGN PATENTS 1,001,901　1/57　Germany.

DON A. WAITE, *Primary Examiner.*